United States Patent [19]

Hung et al.

[11] Patent Number: 5,408,020

[45] Date of Patent: Apr. 18, 1995

[54] COPOLYMERS OF PERHALO-2,2-DI-LOWERALKYL-1,3-DIOXOLE, AND PERFLUORO-2-METHYLENE-4-METHYL-1,3-DIOXOLANE

[75] Inventors: Ming-Hong Hung, Wilmington, Del.; Keith W. Palmer, Landenberg, Pa.; Paul R. Resnick, Wilmington, Del.

[73] Assignee: E. I. du Pont de Nemours and Company, Wilmington, Del.

[21] Appl. No.: 239,777

[22] Filed: May 9, 1994

[51] Int. Cl.⁶ .............................................. C08F 16/24
[52] U.S. Cl. ....................................... 526/247; 526/254
[58] Field of Search ................................ 526/247, 254

[56] References Cited

U.S. PATENT DOCUMENTS

| | | | |
|---|---|---|---|
| 3,308,107 | 3/1967 | Selman et al. | 526/247 |
| 3,978,030 | 8/1976 | Resnick | 526/247 |
| 4,675,380 | 6/1987 | Buckmaster et al. | 528/481 |
| 4,946,902 | 8/1990 | Bekiarian et al. | 525/326.2 |
| 5,019,632 | 5/1991 | Slocum et al. | 526/68 |
| 5,084,498 | 1/1992 | Van Gulick | 524/358 |
| 5,276,121 | 1/1994 | Resnick | 526/247 |

*Primary Examiner*—John Kight, III
*Assistant Examiner*—Terressa Mosley
*Attorney, Agent, or Firm*—Edwin Tocker

[57] ABSTRACT

The comonomers are perfluorocyclic unsaturated compounds, copolymerized to form amorphous copolymer. Such copolymer forms optically clear tough coating and films.

6 Claims, No Drawings

COPOLYMERS OF PERHALO-2,2-DI-LOWERALKYL-1,3-DIOXOLE, AND PERFLUORO-2-METHYLENE-4-METHYL-1,3-DIOXOLANE

BACKGROUND OF THE INVENTION

This invention relates to copolymers of perfluorinated cyclic monomers.

U.S. Pat. No. 5,276,121 discloses amorphous copolymers of 1–99.5 mol % of perfluoro-2,2-dimethyl-1,3-dioxole (PDD) with 99–0.5 mol % of perfluoro(butenyl vinyl ether) (PBVE), optionally containing certain additional monomers. The copolymers have good optical clarity, a low refractive index, and having glass transition temperature ($T_g$) generally at least 120° C., especially at least 180° C., and even at least 200° C., depending on the PDD content of the copolymer. A wide variety of utilities are disclosed, taking advantage of the fine optical properties of the copolymer and high thermal stability, and in addition the surprisingly greater solubility in such solvent as Fluorinert® FC-75 as compared to amorphous copolymer of PDD/tetrafluoroethylene.

Unfortunately, the PBVE comonomer is very expensive, making it desirable to have a more economical copolymer which exhibits comparable optical, thermal and solubility properties.

SUMMARY OF THE INVENTION

The present invention provides this more economical copolymer, namely copolymer comprising perhalo-2,2-di-loweralkyl-1,3-dioxole and perfluoro-2-methylene-4-methyl-1,3-dioxolane (PMD) which exhibits these comparable properties. Each alkyl group independently contains 1 to 3 carbon atoms and their halogen substituents are chlorine or fluorine with the proviso that each alkyl group contains at least one fluorine atom.

DETAILED DESCRIPTION OF THE INVENTION

The principal monomers used in this invention are known in the art. The preparation of the dioxole is disclosed in U.S. Pat. No. 3,978,030. The preparation of PMD is disclosed in U.S. Pat. No. 3,308,107, in which the preparation of crystalline copolymers of PMD with tetrafluoroethylene (TFE) is also disclosed.

The copolymers of the present invention contain the following repeat units distributed along the polymer chain, derived from the dioxole and PMD:

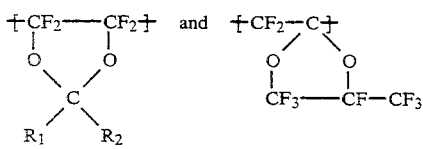

Wherein $R_1$ and $R_2$ are the same or different and each have 1 to 3 carbon atoms which are perhalosubstituted (chlorine or fluorine substituted) and contain at least one fluorine atom. The proportion of dioxole in the compolymer can be 1–99.5 mol % and the proportion of PMD 99–0.5 mol %, to total 100 mol % of the combination of these two monomers. Preferred copolymers have at least 60 mol % of the dioxole and more preferably, at least 80 mol % of the dioxole. Preferably at least 5 mol % of the dioxole is present in the copolymer to improve its melt processibility and physical properties, and more preferably at least 10 mol %. The mol % of dioxole and PMD disclosed herein are based on the amount of dioxole and PMD totalling 100 mol %. The preferred dioxole is perfluoro-2,2-dimethyl-1,3-dioxole (PDD).

At about 10 mol % PMD, the $T_g$ of the copolymer is about 225° C.; and at 30 mol % PMD, the $T_g$ of the copolymer is about 180° C. Copolymers having a $T_g$ of at least 180° C. are also preferred because of the high use temperature afforded by these high $T_g$'s. The $T_g$ of PDD homopolymer is about 330° C. and for PMD is about 125° C.

The copolymer of the present invention can also contain minor amounts of at least one other copolymerizable monomer (different from the dioxole and the dioxolane and less than the amount of dioxole and dioxolane combined), especially halogenated olefins wherein the halogen is Cl or, preferably, F, which modify the physical properties of the copolymer, but in an amount which preserves the amorphous character of the copolymer. The maximum amount of other copolymerizable monomer will depend on the identity of the monomer. Generally, the amount of such other monomers will be less than 40 mol % of the total amount of dioxole and PMD present. Examples of other monomer include tetrafluoroethylene (preferred), chlorotrifluoroethylene and perfluorovinyl ethers such as perfluoropropylvinyl ether, perfluoro-3,6-dioxa-4-methyl-7-octenesulfonyl fluoride and methyl perfluoro-4,7-dioxa-5-methyl-8-nonenoate (CAS 63863-43-4).

Both aqueous emulsion polymerization and polymerization in an organic liquid medium to make polymers of the invention are described in the Examples. In either case, a polymerization initiator is used and temperature is chosen at which the initiator is active and the monomers will all participate in the polymerization reaction. The end groups of the copolymer may be thermally unstable, depending on the use temperature of the copolymer and the particular polymerization system employed, and these groups can be thermally stabilized by treatments such as disclosed in U.S. Pat. Nos. 4,675,380 and 4,946,902.

The copolymers of the present invention are high in molecular weight as indicated qualitatively by being moldable to tough films; i.e., films that can be flexed without breaking, and quantitatively by an inherent viscosity usually in excess of 0.2 dL/g measured as described later herein.

The amorphous character of the copolymers make them fabricable to optically clear articles such as films or coatings so as to be useful for the formation of tough films and tough inert protective, see-through coatings. In this regard, the copolymers are soluble in significant concentrations as shown in the Examples in such common solvent as 1,1,2-trichloro-1,2,2-trifluoroethane, perfluoroaromatics such as hexafluorobenzene, octafluoronaphthalene and fluorinated cyclic ether available as Fluorinert® FC-75, available from 3M, for application to surfaces by conventional means and heating above the $T_g$ of the copolymer to drive off solvent to form a copolymer coating on such surfaces. The copolymer is also melt extrudable so as to be useful as cladding on a light transmitting core to form a fiber optic. The copolymers exhibit a low index of refraction; e.g., generally less than 1.3400 and greater than 1.3100 so as to particularly useful for this purpose. The optical clarity of the film and coating of copolymer of the present invention and NMR analysis thereof indicates that the different comonomer units are randomly distributed along the polymer chain.

EXAMPLES

In the examples, the copolymers made were amorphous as indicated by the absence of first order transition (melting point) by DSC analysis disclosed in U.S. Pat. No. 5,276,121, and the presence of only second order transition, $T_g$. Inherent viscosity of the copolymers was measured at 25° C. in Fluorinert®FC-75. Refractive Index was determined by the procedure of ASTM D-542. Solubility determination was made by adding a measured amount of the copolymer to the solvent and, if necessary to dissolve it within a reasonable period of time, by heating the solvent moderately, e.g., 50° C., and then letting the solution cool to room temperature (25-25° C.). Conditions for maximizing the amount of copolymer that would be dissolved; e.g., heating at a higher temperature and/or vigorously stirring the solvent were not employed.

The following abbreviations are used in the examples:
DSC: Differential Scanning Calorimetry
CFC- 113: 1,1,2-Trichloro- 1,2,2-Trifluoroethane
PDD: Perfluoro-2,2-Dimethyl- 1,3-Dioxole
PMD: Perfluoro-2-Methylene-4-Methyl- 1,3-Dioxolane
PPVE: Perfluoropropylvinyl Ether
PSEPVE: Perfluoro-3,6-Dioxa-4-Methyl-7-Octenesulfonyl Fluoride
EVE: methyl perfluoro-4,7-dioxa-5-methyl-8-nonenoate (CAS 63863-43-4)
TFE: Tetrafluoroethylene
Surflon® S- 111: Ammonium Perfluorononanoate
$T_g$: Glass Transition Temperature
Fluorinert® FC-75: perfluorocyclic ether Example 1

A stainless steel shaker tube was charged with 200 mL CFC-113, 36.6 g PDD, 3.5 g PMD and 3 mL 3.5% perfluoropropionyl peroxide (PPP) in CFC-113. The tube was heated at 35° C. for 4 hours and at 60° C. for one hour. The solvent and excess monomer were removed by evaporation and the resulting polymer dried at 110° C. under vacuum for 16 hours. The product weighted 33 g and was pressed into a tough film at 325° C. The 19F NMR spectrum of the copolymer at 360° C. was consistent with a copolymer of PDD and PMD containing 92 mol % PDD and 8 mol % PMD. The $T_g$ of the copolymer as observed by DSC analysis was 250° C. This example shows that even a small amount of PMD in the copolymer, 8 mol %, toughens the copolymer. PDD homopolymer film of similar molecular weight and prepared the same way is brittle and cracks upon flexing.

When this procedure was repeated but using a charge of only 1.0 g PMD, the polymeric product weighed 28.0 g and was pressed into a somewhat brittle film at 360° C. The infrared spectrum showed the presence of less PMD in the copolymer.

Example 2

To a glass polymerization tube was charged PMD (4.8 g, 19.7 mmole), F-113 (3 mL), Surflon® S-111 (0.21 g), Na₂HPO₄x7H₂O (0.24 g), (NH₄)₂S₂O₈ (0.15 g), and N₂ degassed distilled H₂O (50 mL). The headspace over the solution was purged with N₂ and the tube was flame sealed. The tube was then heated at 75° C. with vigorous shaking for 5 hours. The resultant reaction mixture was treated with aqueous HCl (80 mL, 6.3 M) to precipitate the copolymer. The copolymer was rinsed in a blender with H2O (3×200 mL) and acetone (3×200 mL). The copolymer was then dried in a vacuum oven (150 mm Hg, 150° C.) for 24 hours to remove solvent residue. White powdered copolymer was obtained (3.0 g). This copolymer exhibited a $T_g$ at 125° C. as determined by DSC. The inherent viscosity of the copolymer was 0.204 dL/g.

Example 3

To a glass polymerization tube was charged PMD (5.0 g, 20.5 mmol), PDD (0.5 g, 2.0 mmol), F-113 (3 mL), Surflon® S-111 (0.20 g), Na₂HPO₄x7H₂O (0.24 g), (NH₄)₂S₂O₈ (0.14 g), and N₂ degassed distilled H₂O (50 mL). The headspace over the solution was purged with N₂ and the tube was flame sealed. The tube was then heated at 70° C. with vigorous shaking for 4 hours. The reaction mixture was treated with aqueous HCl (80 mL, 8.4 M) to precipitate the copolymer. The copolymer was rinsed in a blender with H₂O (3×200 mL) and acetone (3×200 mL). The polymer was then dried in a vacuum oven (150 mm Hg, 150° C.) for 24 hours to remove solvent residue. White powdered copolymer was obtained (3.2 g, 58%). This copolymer exhibited a $T_g$ at 128° C. as determined by DSC. The composition of this copolymer was determined to be PMD/PDD=92.1/7.9 (mol %) by high temperature melt ¹⁹F NMR at 360° C. The copolymer had an inherent viscosity of 0.419 dL/g.

Example 4

To a glass polymerization tube was charged PMD (0.5 g, 2.0 mmol), PDD (5.0 g, 20.5 mmol), CFC-113 (3 mL), Surflon® S-111 (0.21 g), Na₂HPO₄x7H₂O (0.24 g), (NH₄)₂S₂O₈ (0.15 g), and N₂ degassed distilled H₂O (50 mL). The headspace over the solution was purged with N₂ and the tube was flame sealed. The tube was then heated at 75° C. with vigorous shaking for 5 hours. The reaction mixture was treated with aqueous HCl (80 mL, 6.3 M) to precipitate the copolymer. The copolymer was rinsed in a blender with H2O (3×200 mL) and acetone (3×200 mL). The copolymer was then dried in a vacuum oven (150 mm Hg, 150° C.) for 24 hours to remove solvent residue. White powdered copolymer was obtained (3.4 g) . This copolymer exhibited a $T_g$ at 250° C. as determined by DSC. The composition of this copolymer was determined to be PMD/PDD=7.7/92.3 (mol %) by high temperature melt ¹⁹F NMR at 260° C. as a 6% mass solution in octafluoronaphthalene. The copolymer had an inherent viscosity of 1.092 dL/g.

Example 5

To a glass polymerization tube was charged PMD (0.5 g, 2.0 mmol), PDD (2.6 g, 10.6 mmol), PSEPVE (2.5 g, 5.6 mmol), CFC- 113(3 mL), Surflon®S-111 (0.20 g), Na₂HPO₄x7H₂O (0.24 g), (NH₄)₂S₂O₈ (0.14 g), and N2 degassed distilled H₂O (50 mL). The headspace over the solution was purged with N₂ and the tube was flame sealed. The tube was then heated at 70° C. with vigorous shaking for 4 hours. The reaction mixture was treated with aqueous HCl (80 mL, 8.4 M) to precipitate the copolymer. The copolymer was rinsed in a blender with H₂O (3×200 mL) and acetone (3×200 mL). The copolymer was then dried in a vacuum oven (150 mm Hg, 150° C.) for 24 hours to remove solvent residue. White powdered copolymer was obtained (2.0 g, 36%). This copolymer exhibited a $T_g$ at 162° C. as determined by DSC. The presence of PSEPVE in the copolymer was confirmed by infrared analysis.

Example 6

In a 210 mL Hastalloy C. shaker tube was charged PMD (8.7 g, 35.6 mmol), PDD (0.85 g, 3.5 mmol), CFC-113 (5 mL), Surflon ® S-111 (0.23 g), Na$_2$HPO$_4$x-7H$_2$O (0.40 g), (NH$_4$)$_2$S$_2$O$_8$ (0.16 g), and N$_2$ degassed distilled H$_2$O (75 mL). The tube was cooled and evacuated twice, then TFE (1.0 g, 10.0 mmol) was transferred into the tube. The tube was sealed and heated with vigorous shaking at 70° C. for 5 hours. The tube was then unloaded and the reaction mixture treated with aqueous HC 1 (40 mL, 16.8 M) to precipitate the copolymer. The copolymer was rinsed in a blender with H$_2$O (3×200 mL) and acetone (3×200 mL). The copolymer was then dried in a vacuum oven (150 mm Hg, 150° C.) for 24 hours to remove solvent residue. White powdered copolymer was obtained (4.7 g, 44%). This copolymer exhibited a T$_g$ at 118° C. as determined by DSC and an inherent viscosity of 0.224 dL/g.

Example 7

In a 210 mL stainless steel tube was charged PMD monomer (5.0 g, 20.5 retool), PDD monomer (5.0 g, 20.5 mmol), CFC-113 (35 g) and 4,4'-bis(t-butylcyclohexyl)peroxy dicarbonate (0.02 g). This tube was cooled, evacuated and then heated at 60° C. for 3 hours under shaking. The polymer unloaded from the tube was dried under vacuum (150 mm) at 100° C. for 24 hours, 3.7 g (37% conversion) white powdered copolymer was obtained. This copolymer has a T$_g$ at 136.1 ° C. as determined by DSC. The composition of this copolymer was determined to be PMD/PDD=77.0/23.0 (mol %) by 19$_F$high temperature melt NMR at 340° C. The copolymer exhibited an inherent viscosity of 0.221 dL/g and the copolymer exhibited an index of refraction (n$_d^{20}$) of 1.3300. Five to 6 g of copolymer could be dissolved in 100 g of FC-75 and separately in 100 g CFC-113, to form 5 to 6 wt % copolymer solution in each solvent.

Example 8

In a glass polymerization tube was charged PMD monomer (3.0 g, 12.3 mmol), PDD monomer (7.0 g, 28.7 mmol), CFC-113 (30 g) and 4,4'-bis(t-butylcyclohexyl)peroxy dicarbonate (0.02 g) . This tube was cooled in liquid nitrogen, evacuated, purged with nitrogen and then sealed. After heating at 60° C. for 3 hours, the tube was opened, solvent was removed in vacuo and the residual copolymer was dried in a vacuum oven (150 mm) at 100° C. for 24 hours 6.0 g (60% conversion) white powdered copolymer was obtained. This copolymer has a T$_g$ at 161.1° C. as determined by DSC measurement. The composition of this copolymer was determined to be PMD/PDD=36.5/63.5 (mol %) by $^{19}$F high temperature melt NMR at 340° C. The copolymer exhibited an inherent viscosity at of 0.201 dL/g and film of the copolymer exhibited an index of refraction (n$_d^{20}$) of 1.3 145. Five and 3 to 4 wt % copolymer solutions were prepared from FC-75 and CFC-113, respectively.

Example 9

In a 210 mL stainless steel tube was charged PMD monomer (8.0 g, 32.8 mmol), PDD monomer (2.0 g, 8.2 mmol), CFC-113 (35 g) and 4,4'-bis(t-butylcyclohexyl)peroxy dicarbonate (0.02 g). This tube was cooled, evacuated, and TFE (1.0 g, 10 mmol) was transferred into the tube. This tube was sealed and heated at 60° C. for 3 hours under shaking. After cooling, the unloaded copolymer was dried in a vacuum oven (150 mm) at 100° C. for 24 hours. 4.3 g (39.1% conversion) white powdered copolymer was obtained. This copolymer only exhibited a T$_g$ at 115.5° C. as determined by DSC measurement. The composition of this copolymer was determined to be PMD/PDD/TFE =76.7/12.8/10.5 (mol %) by $^{19}$F high temperature melt NMR at 340° C. The copolymer exhibited an inherent viscosity of 0.214 dL/g.

Example 10

In a stainless steel tube was charged PMD monomer (4.0 g, 16.4 mmol), PDD monomer (6.0 g, 24.6 mmol), CFC-113 (35 g) and 4,4'-bis(t-butylcyclohexyl)peroxy dicarbonate (0.02 g). This tube was cooled, evacuated, and TFE (1.0 g, 10 mmol) was transferred into the tube. This tube was sealed and heated at 60° C. for 3 hours under shaking. Similar workup procedure as described in Example 9 afforded white copowdered polymer 5.4 g (45.5% conversion). This copolymer exhibited a single T$_g$ at 113.7° C. as determined by DSC measurement. The composition of this copolymer was determined to be PMD/PDD/TFE=37.4/37.4/25.1 (mol %) by $^{19}$F high temperature melt NMR at 340° C. The copolymer exhibited an inherent viscosity of 0.355 dL/g. Solutions of 6 to 7 wt % of the copolymer in FC-75 and CFC-113 were prepared.

Example 11

In a stainless steel tube was charged PMD monomer (1.0 g, 4.1 mmol), PDD monomer (9.0 g, 36.9 mmol), EVE (2.0 g, 4.7 retool), 1,1,2-trichloro- 1,2,2-trifluoroethane (45 g) and 4,4'-bis(t-butylcyclohexyl)peroxy dicarbonate (0.02 g). This tube was cooled, evacuated, and TFE (1.0 g, 10 mmol) was transferred into the tube. This tube was sealed and heated at 60° C. for 3 hours under shaking. After same workup and dried in a vacuum oven (150 mm) at 100° C. for 24 hours, 5.5 g (42.3% conversion) white polymer was obtained. This copolymer exhibited a T$_g$ at 171.7° C. as determined by DSC measurement and an inherent viscosity of 0.38 dL/g.

Example 12

In a 210 mL stainless steel tube was charged PMD monomer (8.0 g, 32.8 mmol), PDD monomer (2.0 g, 8.2 mmol), CFC-113 (35 g) and 4,4'-bis(t-butylcyclohexyl)-peroxy dicarbonate (0.02 g). This tube was cooled, evacuated and heated at 60° C. for 3 hours. The tube was opened, solvent was removed in vacuo and the residual polymer was dried in a vacuum oven (150 ram) at 100° C. for 24 hr. to yield 5.2 g (52% conversion) of white powdered copolymer. This copolymer had a T$_g$ at 128.3° C. as determined by DSC measurement. The copolymer exhibited an inherent viscosity of 0.151 dL/g. The composition of this copolymer was determined to be PMD/PDD=84.6/15.4 (mol %) by $^{19}$F high temperature melt NMR at 340° C. This copolymer had a solubility of 2–3 wt % in both FC-75 and CFC-113 solvents.

Example 13

In a 210 mL stainless steel tube was charged PMD monomer (1.0 g, 4.1 mmol), PDD (9.0 g, 36.9 mmol), CFC-113 (35 g) and 4,4'-bis(t-butylcyclohexyl)peroxy dicarbonate (0.02 g). This tube was cooled, evacuated, and TFE (1.0 g, 10 mmol) was transferred into the tube. This tube was sealed and heated at 60° C. for 3 hr under shaking. After cooling, the unloaded copolymer was dried in a vacuum oven (150 mm) at 100° C. for 24 hr to yield 8.6 g (78.2% conversion) of white powdered copolymer. This copolymer only exhibited a T$_g$ at 141.8° C. as determined by DSC measurement. The composition of this copolymer was determined to be PMD/PDD/TFE=9.4/56.2/34.4 (mol %) by $^{19}$F high temperature melt NMR at 340° C. This copolymer exhibited an inherent viscosity of 0.804 dL/g and a refractive index of 1.3120. This copolymer also had a solubility of 16 wt % in FC-75 and 1–2 wt % in CFC-113 solvents.

What is claimed is:

1. Amorphous copolymer comprising perhalo-2,2-di loweralkyl-1,3-dioxole and perfluoro-2-methylene-4-methyl-1,3-dioxolane, wherein each alkyl group independently contain 1 to 3 carbon atoms and their halogen substituents are chlorine or fluorine, with the proviso that each alkyl group contains at least one fluorine atom.

2. The copolymer of claim 1 wherein 1–99.5 mol % of the dioxole is present and complementally to total 100 mol %, 0.5 to 99 mol % of the dioxolane is present, to total 100 mol % of the dioxole plus the dioxolane.

3. The copolymer of claim 2 wherein at least 5 mol % of the dioxolane is present.

4. The copolymer of claim 2 wherein at least 60 mol % of the dioxole is present.

5. The copolymer of claim 1 wherein said dioxole is perfluoro-2,2-dimethyl-1,3-dioxole.

6. The copolymer of claim 1 wherein said copolymer contains up to 40 mol %, based on the total of said dioxole plus said dioxolane, of at least one additional monomer.

* * * * *